US006822952B2

(12) United States Patent
Abrol et al.

(10) Patent No.: US 6,822,952 B2
(45) Date of Patent: Nov. 23, 2004

(54) MAINTAINING PACKET DATA CONNECTIVITY IN A WIRELESS COMMUNICATIONS NETWORK

(75) Inventors: Nischal Abrol, San Diego, CA (US); Marcello Lioy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 238 days.

(21) Appl. No.: 10/014,294

(22) Filed: Dec. 11, 2001

(65) Prior Publication Data

US 2003/0099219 A1 May 29, 2003

Related U.S. Application Data

(60) Provisional application No. 60/333,642, filed on Nov. 26, 2001.

(51) Int. Cl.[7] .................................................. H04Q 7/24
(52) U.S. Cl. ...................................... 370/338; 370/349
(58) Field of Search ................................ 370/338, 329, 370/351, 349, 341, 342, 352, 335

(56) References Cited

U.S. PATENT DOCUMENTS

| 2001/0050907 A1 | * | 12/2001 | Madour et al. | ............. | 370/329 |
| 2002/0097707 A1 | * | 7/2002 | Balazinski et al. | ......... | 370/351 |
| 2003/0021252 A1 | * | 1/2003 | Harper et al. | ............... | 370/338 |

FOREIGN PATENT DOCUMENTS

| EP | 1063805 | 6/2000 |
| WO | 0078081 | 12/2000 |
| WO | 0150669 | 7/2001 |
| WO | 0154335 | 7/2001 |
| WO | 0156309 | 8/2001 |
| WO | WO-01/67786 | * 9/2001 |
| WO | 0182502 | 11/2001 |

OTHER PUBLICATIONS

Bhalla et al., "Releaseing Resources in Mobilr IP" Feb. 27, 2001, Cisco Systems, p. 1–8.*

* cited by examiner

Primary Examiner—Chau Nguyen
Assistant Examiner—Soon-Dong Hyun
(74) Attorney, Agent, or Firm—Philip R. Wadsworth; Charles D. Brown; Timothy F. Loomis

(57) ABSTRACT

Techniques for maintaining packet data connectivity in a wireless communications network are presented. A mobile station detects a change from a first packet control function (PCF) to a second PCF. The first PCF is connected to a first packet data service node (PDSN). The second PCF is connected to a second PDSN. The mobile station consults a database configured to map at least one previously visited PCF to a servicing PDSN. Based at least in part on the consulting, the mobile station observes one from among a plurality of predetermined origination patterns, wherein an origination pattern defines origination functions to be performed by the mobile station. As such, zombie PPP and mobile IP instances may be detected and handled.

17 Claims, 4 Drawing Sheets

MAINTAINING PACKET DATA CONNECTIVITY IN A WIRELESS COMMUNICATIONS NETWORK

RELATED APPLICATIONS

This application claims priority to U.S. Provisional Application No. 60/333,642 filed on Nov. 26, 2001.

BACKGROUND OF THE INVENTION

1. Field of the Invention

This invention relates generally to the field of wireless communications. More specifically, this invention relates to novel and improved techniques for maintaining packet data connectivity in a wireless communications network.

2. Description of Related Art

Recent innovations in wireless communications and computer-related technologies, as well as the unprecedented growth of Internet subscribers, have paved the way for mobile computing. In fact, the popularity of mobile computing has placed greater demands on the current Internet infrastructure to provide mobile users with more support. A crucial part of meeting these demands and providing users with the necessary support is the use of Code Division Multiple Access (CDMA) technology.

CDMA is a digital radio-frequency (RF) channelization technique. CDMA2000 is a recently promulgated CDMA standard. Release 0 of CDMA2000 is introduced in TIA/EIA/IS2000.1-2, entitled "INTRODUCTION TO CDMA2000 SPREAD SPECTRUM SYSTEMS, RELEASE 0-ADDENDUM 2," published in April 2001 and herein incorporated by reference. Release A of CDMA2000 is introduced in IS-2000-A, entitled "INTRODUCTION TO CDMA2000 STANDARDS FOR SPREAD SPECTRUM SYSTEMS," published in June 2000 and herein incorporated by reference.

In various wireless communications system architectures, a mobile station wirelessly connects to a radio access network (RAN) that services a given area. Each RAN includes a base station controller (BSC), which includes a packet control function (PCF). The PCF acts as an interface to a packet data service node (PDSN), which in turn acts as an interface to IP (Internet Protocol) networks.

When a mobile station roams into an area serviced by a RAN, the PCF or PDSN may change. According to the CDMA2000 specification, upon detecting a change in PCFs, the mobile sends an Enhanced Origination Message (EOM) to the RAN indicating that the mobile requires connectivity with a PDSN associated with the RAN. A change in PDSNs generally requires the mobile to negotiate a PPP (Point-to-Point Protocol) session with the new PDSN and perform mobile IP registration.

More particularly, after establishing and maintaining a PPP session with a first PDSN in a first service area, a mobile station may go dormant to conserve resources. The mobile may then venture into a second service area associated with a second PDSN, negotiate PPP, and register mobile IP. The mobile may again go dormant and, as the mobile travels, it may return back to the first service area, where a PPP instance—a "zombie instance"—associated with the earlier visit is still operative.

In CDMA2000 Release A systems, a mobile station sends wireless IDs of the previous PCF in the EOM. Such systems can determine whether the mobile emerging from dormancy mode had ventured into another PDSN service area during the period of dormancy. If the new PCF is the same as the previous PCF, then the traffic channel is not brought up. Otherwise, the traffic channel is brought up, PPP resynchronizes, and mobile IP re-registers. However, the EOM in CDMA2000 Release 0 systems does not provide for sending of the wireless IDs of the previous PCF. As such, CDMA2000 Release 0 systems cannot identify and handle zombie PPP instances.

SUMMARY OF THE INVENTION

Novel techniques consistent with the principles of the present invention, as embodied and broadly described herein, are presented for maintaining packet data connectivity in a wireless communications network. In one embodiment, a mobile station detects a change from a first packet control function (PCF) to a second PCF. The first PCF is connected to a first packet data service node (PDSN). The second PCF is connected to a second PDSN. The mobile station consults a database configured to map at least one previously visited PCF to a servicing PDSN. Based at least in part on the consultation, the mobile station observes one from among a plurality of predetermined origination patterns, wherein an origination pattern defines origination functions to be performed by the mobile station.

DETAILED DESCRIPTION OF THE INVENTION

Figure 1:
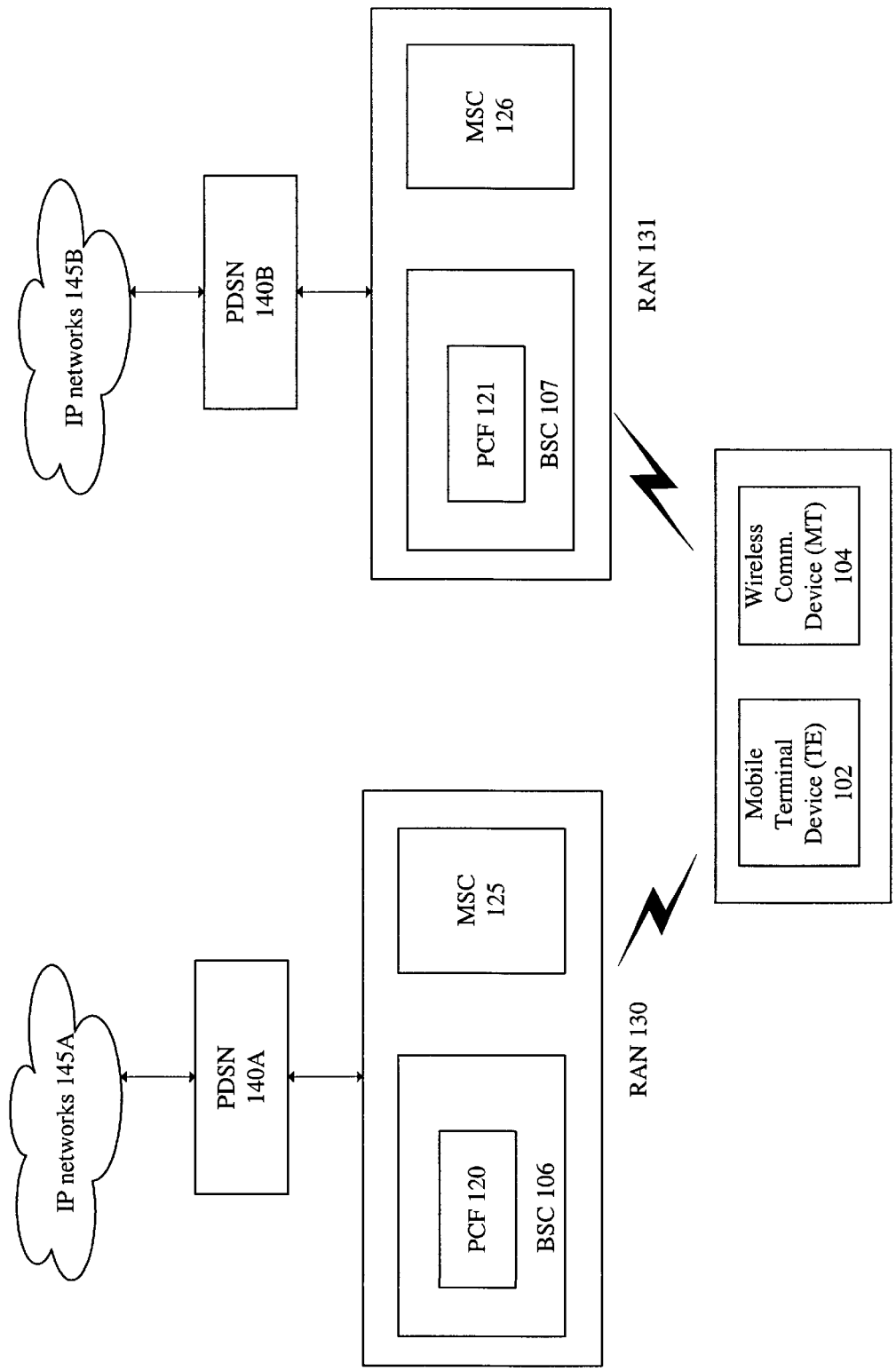
FIG. 1 illustrates a wireless communications system architecture.

The following detailed description refers to the accompanying drawings that illustrate embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be in many different embodiments of software, firmware, and hardware in the entities illustrated apparent to one of ordinary skill in the art that the embodiments as described below may be implemented in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be stored in any storage device, such as, for example, a computer system (nonvolatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

Embodiments of the present invention provide techniques for a mobile station to maintain packet connectivity in a wireless communications network. A mobile station connects to the Internet or other network via a packet control function (PCF) in a radio access network (RAN). The PCF is associated with a packet data service node (PDSN) that acts as a foreign agent. The mobile station maintains a database that maps identifiers of each PCF visited by the mobile station to the IP address of the associated PDSN. The PDSN IP address may be obtained by the mobile station via a mobile IP agent advertisement message broadcast by the PDSN. The mobile station detects a change in PCFs, which may result from movement of the mobile station into another service area. The new PCF has an associated new PDSN.

The mobile station consults a database to determine how the new PCF and PDSN are related to the previous PCF and PDSN. In particular, the new PCF may have been previously visited by the mobile station, and the new PDSN may be the same as the previous PDSN. Based on the database consultation, the mobile station performs various origination functions. For instance, origination functions may include setting the DRS bit in an Enhanced Origination Message (EOM) to one or zero, renegotiating a Point-to-Point Protocol (PPP) session, or sending a mobile IP agent solicitation message.

Thus, the mobile station's own origination functions may ensure that zombie sessions do not precipitate problems in wireless communications systems.

CDMA was first defined in the Telecommunications Industry Association/Electronics Industries Association Interim Standard-95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM," published in July 1993 and herein incorporated by reference. Recently promulgated CDMA standards include TIA/EIA/IS-856, entitled "CDMA2000, HIGH RATE PACKET DATA AIR INTERFACE SPECIFICATION," published in November 2000 and herein incorporated by reference. TIA/EIA/IS-856 is also known as 1×EV. Wireless communications systems employing CDMA technology assign a unique code to communication signals and spread these communication signals across a common (wideband) spread spectrum bandwidth.

Other support is made possible by applying various well-known protocols to control, manage, or otherwise facilitate different aspects of wireless communications. For example, the lifeblood of the Internet infrastructure, the Internet Protocol (IP), has been incorporated in many wireless communication services to accommodate packet-oriented services. The IP protocol is a network layer protocol that encapsulates data into IP packets for transmission. In particular, the IP protocol specifies the addressing and routing of packets (datagrams) between host computers. Version 4 of the IP protocol ("IPv4") is defined in Request For Comments 791 (RFC 791), entitled "INTERNET PROTOCOL DARPA INTERNET PROGRAM PROTOCOL SPECIFICATION," published September 1981, and herein incorporated by reference.

Another well-known protocol incorporated in wireless communications systems is the Point-to-Point Protocol (PPP) protocol, which provides, inter alia, Internet access. The PPP protocol is described in detail in Request for Comments 1661 (RFC 1661), entitled "THE POINT-TO-POINT PROTOCOL (PPP)," published July 1994 and herein incorporated by reference. The PPP protocol specifies a method for transporting multi-protocol datagrams over point-to-point links.

Ideally, mobile computing should provide a user with seamless and transparent Internet access regardless of time and the user's current point of attachment. Request For Comments 2002 (RFC 2002), entitled "IP MOBILITY SUPPORT," dated October 1996 and herein incorporated by reference, specifies protocol techniques to achieve the transparent forwarding of IP packets to mobile terminals regardless of their particular point of attachment. When the mobile terminal detects that it is no longer operating within its "home" IP network but is visiting a "foreign" IP network, it obtains a foreign network "care-of" address which provides forwarding information necessary to route IP packets to its current point of attachment. This care-of address may be proffered by an agent on the foreign network ("Foreign Agent")—e.g., a router, such as a packet data service node (PDSN)—through its Agent Advertisement message. Mobile IP techniques require that the mobile terminal send a Registration-Request message to a "Mobility Agent" in order to register a desired care-of address. This Mobility Agent may either be a "Home Agent" (i.e., a router in the terminal's home network) or the "Foreign Agent." After registration, the mobile terminal and Mobility Agent may negotiate a PPP session, thus ensuring that their configuration parameters for the PPP link are the same.

FIG. 1 illustrates a wireless communications system architecture 100 in which mobile terminal equipment, TE device 102 (e.g., a mobile terminal, laptop, or palmtop computer), wirelessly connects to either of radio access networks (RANs) 130, 131 via a wireless communications device, MT 104. TE device 102 and MT device 104, which are electronically coupled, may be integrated into a single unit or may be separated out as in an installed mobile phone unit in which a laptop is TE device 102 and the transceiver is MT device 104. The combination of TE device 102 and MT device 104, whether integrated or separate, is also referred to as a mobile node, and is denoted in FIG. 1 as mobile station (MS) 103.

Each RAN 130, 131 includes a base station controller (BSC) 106, 107, and associated base station transceivers (BSTs) (not shown), and a Mobile Switching Center (MSC) 125, 126. BSC 106, 107 includes a packet control function (PCF) 120, 121. PCF 120, 121 acts as an interface to a packet data service node (PDSN), such as PDSN 140A or 140B. PDSN 140A, 140B may be configured as a router that acts as an interface to IP networks 145A, 145B, such as the Internet and intranets. Each PDSN 140A, 140B is a mobility anchor point for a mobile node, such as MS 103, roaming outside of a home network. Multiple PCFs may connect to a particular PDSN. A particular PCF may connect to multiple PDSNs. Each PDSN has a unique IP address.

Various roaming situations involve MS 103. First, in a PCF-to-PCF handoff situation (intra-PDSN), MS 103 moves from one BSC to another BSC, that is, MS 103 moves from one PCF to another PCF, wherein both BSCs (PCFs) are connected to the same PDSN. This type of handoff may not require the renegotiation of the PPP session between MS 103 and the PDSN because the PDSN can reassociate the PPP state of MS 103 with the new BSC. Second, in a PDSN-to-PDSN handoff situation (inter-PDSN), MS 103 roams into a new network with a different PDSN. As such, the mobile node is required to establish a new PPP link to the new PDSN and then perform mobile IP registration again.

As shown in FIG. 1, PDSN 140A is associated with PCF 120 and PDSN 140B is associated with PCF 121. If MS 103 enters the service area of RAN 130, MS 103 may bring up a PPP session with PDSN 140A. After a predetermined interval of time, MS 103 may become dormant. That is, at some point MS 103 may release a traffic channel to conserve over-the-air resources while maintaining PPP session connectivity with PDSN 140A.

MS 103 may then move from the service area of PDSN 140A to the service area of PDSN 140B. According to the CDMA2000 specification, upon detecting a change in PCFs, MS 103 sends an Enhanced Origination Message (EOM) to RAN 131 indicating that MS 103 requires connectivity with PDSN 140B. Because PDSN 140B does not have a PPP session for MS 103, PDSN 140B brings up a traffic channel and initiates PPP negotiation between PDSN 140B and MS 103. The EOM includes DRS (Data-Ready-Send) bit information. Accordingly, when the DRS bit equals 0, MS 103 conveys that it has no application data to send. Conversely, when the DRS bit equals 1, MS 103 conveys that it has application data to send.

After establishing and maintaining a PPP session with PDSN 140B, MS 103 may again go dormant to conserve resources. If MS 103 moves back to the service area of PDSN 140A, MS 103 detects a change in PCFs and sends an origination message to RAN 130 with DRS equal to 0. Because no mechanism exists to notify PDSN 140A that MS 103 ventured into the service area of PDSN 140B, PDSN 140A does not renegotiate the PPP session between PDSN 140A and MS 103. As such, the RAN-PDSN (R-P) interface between PDSN 140B and MS 103 is still operative even though MS 103 is in the service area of PDSN 140A. Thus, the PPP instance associated with the earlier venture of MS 103 into the service area of PDSN 140A is a so-called "zombie" PPP instance of MS 103 in PDSN 140A.

In CDMA2000 Release A systems, the mobile sends wireless IDs of the previous PCF in the EOM. Thus, such systems can determine whether MS 103 emerging from dormancy mode had ventured into another PDSN service area. If the new PCF is the same as the previous PCF, then the traffic channel is not brought up. Otherwise, the traffic channel is brought up, PPP resynchronizes, and mobile IP reregisters. The EOM in CDMA2000 Release 0 systems does not provide for sending of the wireless IDs of the previous PCF. As such, CDMA2000 Release 0 systems cannot identify and handle zombie PPP instances.

Figure 2:
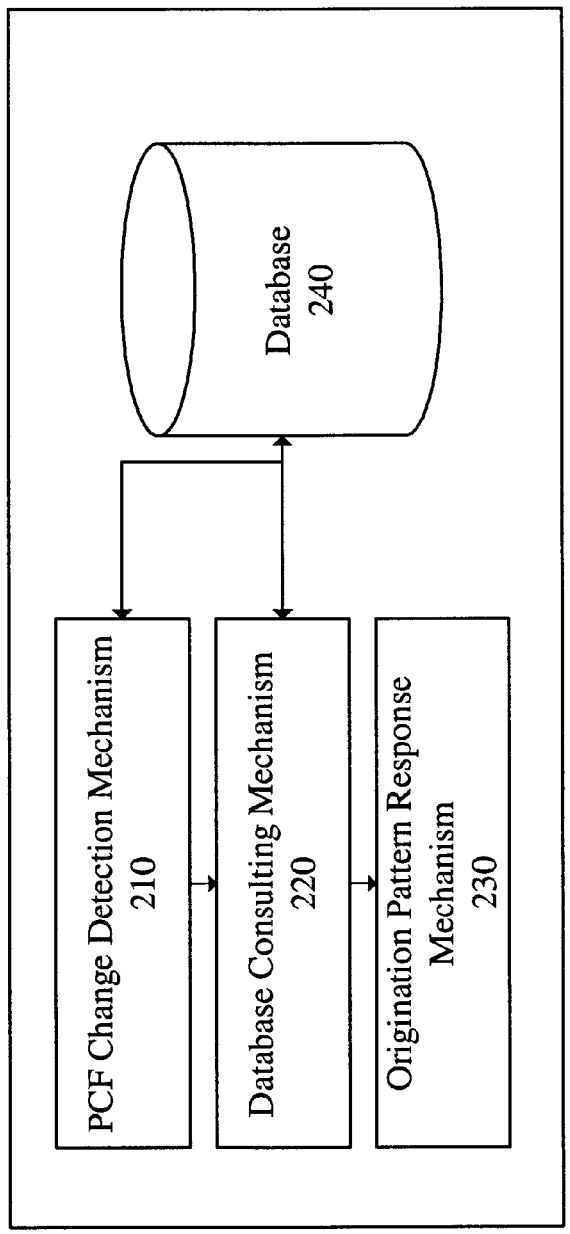
FIG. 2 is a high-level block diagram of a mobile station according to an embodiment of the present invention.

FIG. 2 is a high-level block diagram of a mobile station (MS) 200 according to an embodiment of the present invention. MS 200 includes a PCF change detection mechanism 210, a database consulting mechanism 220, an origination pattern response mechanism 230, and a database 240. It is to be appreciated that entities within MS 200 may be incorporated within a TE device or MT device, as described generally above with respect to FIG. 1. Further, database 240 need not reside on MS 200 in other embodiments if MS 200 can access database 240. In some embodiments, PCF change detection mechanism 210 and database consulting mechanism 220 may comprise one module.

PCF change detection mechanism 210 detects when MS 200 has moved from an area serviced by a first PCF to an area serviced by a second PCF. In CDMA2000 systems, for example, a PCF may be identified uniquely by a set of wireless network IDs. In particular, CDMA2000 provides for a system identifier (SID), network identifier (NID), and packet zone identifier (PZID). Together, an SID/NID/PZID combination, broadcasted by the PCF in a paging channel, uniquely identifies each PCF, thus assisting MS 200 in determining whether MS 200 has ventured into a different service area. In some embodiments, PCF change detection mechanism 210 may compare the broadcasted wireless network IDs to wireless IDs recently stored in MS 200, such as in database 240 or another nonvolatile or volatile memory. Therefore, when the compared IDs do not match, PCF change detection mechanism 210 may register a change in PCFs, which would correspond to movement by MS 200 into a new service area.

Figure 3:
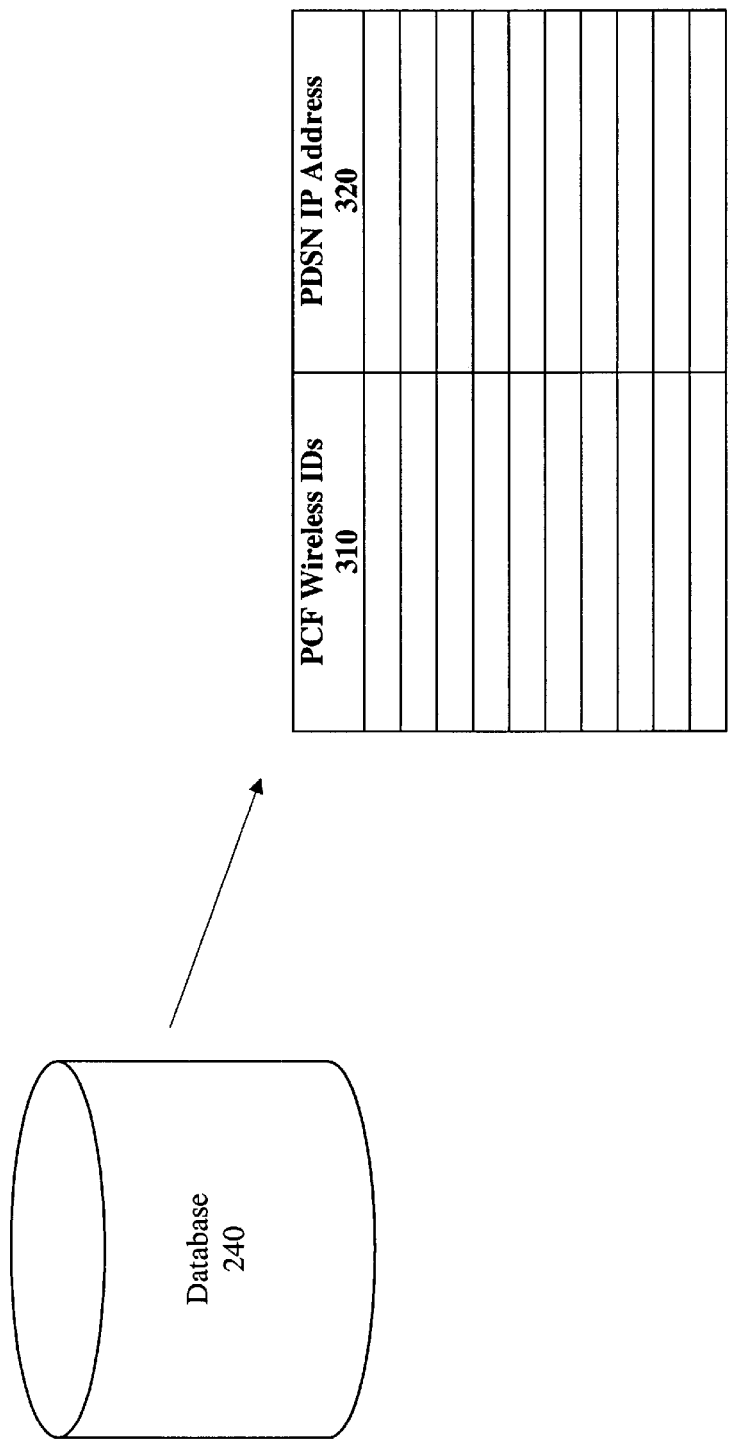
FIG. 3 illustrates exemplary contents of a database according to an embodiment of the present invention.

FIG. 3 illustrates exemplary contents of database 240 in MS 200 according to an embodiment of the present invention. As shown, database 240 maps wireless IDs of each PCF visited by MS 200 to the IP address of the PDSN corresponding to the visited PCF. The IP address of each PDSN may be provided by an agent advertisement sent by a PDSN, or within the context of a PPP-IPCP negotiation. IPCP is a part of a family of network control protocols included in the PPP protocol and described in Request for Comments (RFC) 1332, "THE PPP INTERNET PROTOCOL CONTROL PROTOCOL (IPCP)," published in May 1992 and herein incorporated by reference. Database 240 may maintain a history of such PCF wireless ID to PDSN IP address mappings. In some embodiments, older records in database 240 may be occasionally deleted to conserve storage capacity.

Database consulting mechanism 220 in FIG. 2 may consult database 240 to make various determinations. For instance, database consulting mechanism 220 may determine, based on the mappings: (1) whether the new PCF was previously visited by MS 200 and the PDSN associated with the new PCF is the same PDSN as the most recently visited PDSN; (2) whether the new PCF was previously visited by MS 200 and the new PDSN differs from the most recently visited PDSN; and (3) whether the new PCF was not previously visited by MS 200. Specifically, database consulting mechanism 220 may compare the wireless IDs of the new PCF with wireless IDs of previously visited PCFs that are stored in database 240. Further, database consulting mechanism 220 may compare the IP address of the new PDSN with the stored IP address of the most recently visited PDSN.

Origination pattern response mechanism 230 in MS 200 causes MS 200 to observe predetermined origination patterns. In an exemplary implementation, origination patterns define specific origination functions that MS 200 should perform when sending Enhanced Origination Messages (EOMs). Origination pattern response mechanism 230 selects particular origination patterns based in part upon the consultation of database 240 by database consulting mechanism 220. More specifically, because database 240 provides a history of PCF and PDSN mappings, MS 200 may accurately and efficiently take steps to ensure that zombie instances at PDSNs previously visited and then returned thereto are not mistaken as valid PPP sessions. Origination functions may include any number of exemplary actions, such as sending an agent solicitation, sending an EOM with the DRS bit appropriately set to 0 or 1, re-registering mobile IP, or renegotiating PPP.

Figure 4:
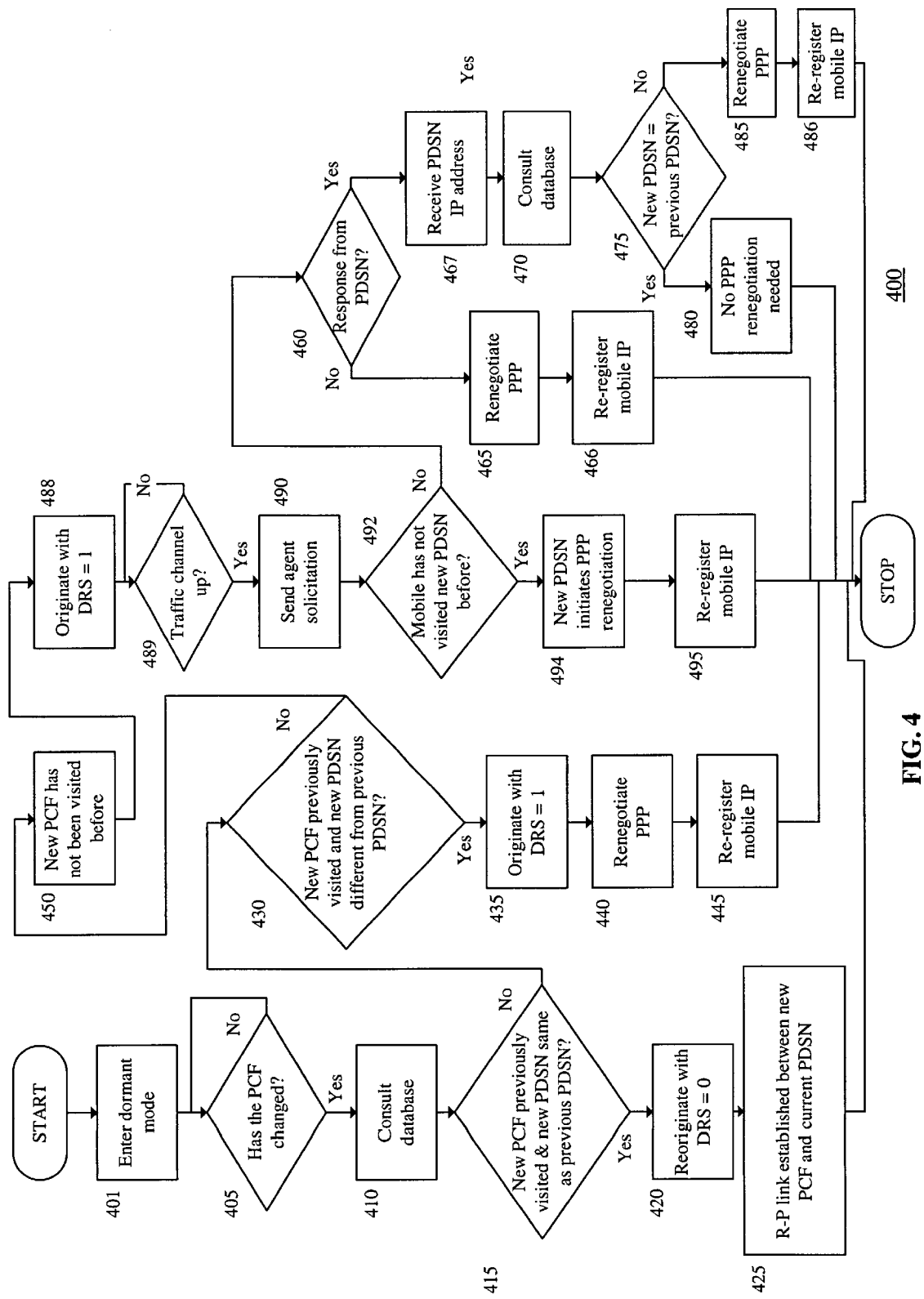
FIG. 4 is a high-level functional flow diagram of a process according to an embodiment of the present invention.

FIG. 4 is a high-level functional flow diagram of a process 400 according to an embodiment of the present invention. Herein, the term "previous" PDSN denotes a PDSN to which a mobile station is connected immediately before a change in PCFs. In task 401, a MS 200 that is connected to a PCF and associated PDSN enters dormant mode. In task 405, process 400 checks whether the PCF changed, that is, whether MS 200 has moved into a new service area. If the PCF has not changed, then process 400 remains at task 405 to continue the checking. If the PCF changes to a new PCF, then process 400 consults a database in task 410.

In task 415, process 400 determines whether the new PCF was previously visited by MS 200 and the new PCF is connected to the same PDSN as the previous PDSN. If so, in task 420, the dormant MS 200 reoriginates with the DRS bit of the EOM set to 0, thereby indicating to the RAN that MS 200 requires connectivity with the previous PDSN; an R-P (RAN-PDSN) link then can be established between the new PCF and the previous PDSN. Because MS 200 is already registered with the new PDSN, a PPP state and a mobile IP binding exist. Thus, traffic need not be generated for either of these protocols. The R-P link is established in task 425 and process 400 concludes.

If, in task 415, the determination is negative, then process 400 proceeds to task 430. In task 430, process 400 determines whether the new PCF was previously visited and the new PCF uses a different PDSN than the previous PDSN. If so, then the point of attachment of MS 200 to the Internet has changed because the PDSN has changed. As such, the dormant MS 200 originates with the DRS bit of the EOM set to 1 (task 435). MS 200 renegotiates PPP (task 440) because there is a possibility that the new PDSN has a PPP state for MS 200—e.g., a dormant state—that may have been negotiated with different options than were negotiated with the previous PDSN. For instance, the new and previous PDSN may be respectively associated with different vendors or may have been configured differently. MS 200 then re-registers mobile IP (task 445). Process 400 then concludes.

If the determination in task 430 is negative, then process 400 proceeds to task 450, wherein it is noted that the new PCF has not been visited before. The dormant MS 200 originates with the DRS bit set to 1 (task 488). In task 489, MS 200 waits for the traffic channel to come up. Once the traffic channel comes up, MS 200 sends an agent solicitation (task 490), without restarting PPP, to attempt to ascertain the IP address of the PDSN associated with the new PCF. This approach may be considered a conservative one, for MS 200 does not know whether the PDSN has been visited before. If MS 200 has never before visited the new PDSN (task 492), there is no dormancy state for MS 200 at the new PDSN. PPP renegotiation is initiated by the PDSN in task 494, mobile IP is re-registered in task 495, and process 400 concludes. An agent solicitation can be sent in task 490 if the network is set up such that ACCM/PFC/AFC options do not differ among various PDSNs. If the options differ, then MS 200 needs to renegotiate PPP.

If MS 200 has visited the new PDSN before (task 492), then in task 460, MS 200 checks for a response from the PDSN. If there is no response from the PDSN in task 460, then MS 200 may renegotiate PPP (task 465) and re-register mobile IP (task 466), and process 400 then concludes. The failure of the PDSN to respond may indicate that the respective PPP options of MS 200 and the PDSN are different, causing agent solicitation packets to be discarded.

If the PDSN responds in task 460, such as via an agent advertisement, then MS 200 receives the advertised IP address of the PDSN in task 467. Process 400 consults a database in task 470 to check the IP address of the previous PDSN. In task 475, process 400 determines whether the IP address of the new PDSN is identical to the IP address of the previous PDSN. If so, then PPP renegotiation is not needed (task 480), and process 400 concludes. If the respective IP addresses differ in task 475, then PPP is renegotiated in task 485 to ensure that the PPP options of MS 200 and the PDSN are the same, mobile IP is re-registered in task 486, and process 400 concludes.

In another embodiment (not shown), an agent solicitation is not sent by MS 200 in task 490. Instead, PPP is renegotiated. Then, if the PDSN is a different PDSN than the previous PDSN, mobile IP is re-registered.

In another embodiment (not shown), MS 200 is on the traffic channel, that is, MS 200 is not dormant. MS 200 returns to a PDSN/Foreign Agent that has a zombie PPP instance for MS 200. If the PDSN/Foreign Agent sends packets to the Home Agent, the PDSN/Foreign Agent may receive a return message, analogous to an ICMP redirect, which indicates that a binding no longer exists between the home address and care-of address of MS 200. Based on this return message, the PDSN/Foreign Agent can terminate the session with MS 200 and reinitiate a new session.

In another embodiment (not shown), MS 200 is on the traffic channel. The traffic channel may send an In Traffic Systems Parameters Message that conveys PCF SID/NID/PZID wireless IDs. If MS 200 detects a change in PCFs, then MS 200 may follow the tasks of process 400, beginning with task 410, in order to originate appropriately so as to close zombie PPP sessions.

The foregoing description of the preferred embodiments is provided to enable any person skilled in the art to make or use the present invention. Various modifications to these embodiments are possible, and the generic principles presented herein may be applied to other embodiments as well. For instance, the teachings herein may apply generally to protocols wherein a mobile station performs origination functions, such as protocols related to PPP renegotiation and mobile IP reregistration, as well as analogous protocols. In particular, the detailed embodiments presented above can be designed to support one or more wireless communication standards, including the following CDMA standards: IS-95, IS-98, CDMA2000, W-CDMA, some other CDMA standard or a combination thereof. These standards are known in the art and are not discussed in detail herein.

Further, the invention may be implemented in part or in whole as a hardwired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A method of determining whether to renegotiate a Point-to-Point Protocol (PPP) session after a mobile station has entered a dormant mode comprising: detecting a change from a first packet control (PCF) to a second PCF, the first PCF being connected to a packet data service node (PDSN), the second PCF being connected to a PDSN;

determining if the second PCF was previously visited by the mobile station and if the PDSN connected to the second PCF is the same as the PDSN connected to the first PCF;

if the second PCF was previously visited by the mobile station and if the PDSN connected to the second PCF is the same as the PDSN connected to the first PCF, indicating to the radio access network (RAN) that the mobile station requires connectivity to the PDSN connected to the second PCF and not renegotiating the PPP session, if the second PCF was previously visited by the mobile station and the PDSN connected to the second PCF is different than the PDSN connected to the first PCF, renegotiating the PPP session; and if the second PCF was not previously visited by the mobile station renegotiating the PPP session.

2. A method as in claim 1, wherein the renegotiation for the PPP session is originated from the mobile station if the second PCF was previously visited by the mobile station and the PDSN connected to the second PCF is different than the PDSN connected to the first PCF.

3. A method as in claim 2, further comprising the step of the mobile station sending an Enhanced Origination Message with a data-ready-send (DRS) bit of 1.

4. A method as in claim 1, wherein the renegotiation for the PPP session is initiated by the PDSN connected to the second PCF if the second PCF was not previously visited by the mobile station.

5. A method as in claim 4, wherein the mobile station sends an agent solicitation without renegotiating PPP to attempt to ascertain an internet protocol (IP) address of the PDSN connected to the second PCF prior to the PDSN connected to the second PCF initiating the renegotiation for the PPP session.

6. A method as in claim 4, further comprising the step of the mobile station sending Enhanced Origination Message with data-ready-send (DRS) of 1.

7. A method as in claim 1, wherein the indication that the mobile station requires connectivity to the PDSN connected to the second PCF is accomplished through sending an Enhanced Origination Message with a data-ready-send (DRS) bit of 0.

8. A computer-readable medium encoded with a plurality of processor-executable instructions for:

detecting a change from a first packet control function (PCF) to a second PCF, the first PCF being connected to a packet data service node (PDSN), the second PCF being connected to a PDSN;

determining if the second PCF was previously visited by a mobile station and if the PDSN connected to the second PCF is the same as the PDSN connected to the first PCF;

if the second PCF was previously visited by the mobile station and if the PDSN connected to the second PCF is the same as the PDSN connected to the first PCF, indicating to the radio access network (RAN) that the mobile station requires connectivity to the PDSN connected to the second PCF and not renegotiating the PPP session, if the second PCF was previously visited bit the mobile station and the PDSN connected to the second PCF is different than the PDSN connected to the first PCF, renegotiating the PPP session; and if the second PCF was not previously visited by the mobile station, renegotiating the PPP session.

9. The computer-readable medium of claim 8, wherein the renegotiation for the PPP session is originated from the mobile station if the second PCF was previously visited by the mobile station and the PDSN connected to the second PCF is different than the PDSN connected to the first PCF.

10. The computer-readable medium of claim 9, further comprising the step of the mobile station sending an Enhanced Origination Message with a data-ready-send (DRS) bit of 1.

11. The computer-readable medium of claim 8, wherein the renegotiation for the PPP session is initiated by the PDSN connected to the second PCF if the second PCF was not previously visited by the mobile station.

12. A The computer-readable medium of claim 11, wherein the mobile station sends agent solicitation without renegotiating PPP to attempt to ascertain an internet protocol (IP) address of the PDSN connected to the second PCF prior to the PDSN connected to the second PCF initiating the renegotiation for the PPP session.

13. The computer-readable medium of claim 11, further comprising the step of the mobile station sending an Enhanced Origination Message with a data-ready-send (DRS) bit of 1.

14. The computer-readable medium of claim 8, wherein the indication that the mobile station requires connectivity to the PDSN connected to the second PCF is accomplished through sending an Enhanced Origination Message with a data-ready-send (DRS) bit of 0.

15. A mobile station having an apparatus for determining when to renegotiate a Point-to-Point Protocol (PPP) session after the mobile station has entered a dormant mode comprising:

means for detecting a change from a first packet control function (PCF) to a second PCF, the first PCF being connected to a packet data service node (PDSN), the second PCF being connected to a PDSN;

means for determining if the second PCF was previously visited by the mobile station and if the PDSN connected to the second PCF is the same as the bat PDSN connected to the first PCF;

means for indicating to the radio access network (RAN) that the mobile station requires connectivity to the PDSN connected to the second PCF and not renegotiating the PPP session if the second PCF was previously visited by the mobile station and if the PDSN connected to the second PCF is the same as the PDSN connected to the first PCF;

means for renegotiating the PPP if the second PCF was previously visited by the mobile station and the PDSN connected to the second PCF is different than the PDSN connected to the first PCF; and means for renegotiating the PPP session if the second PCF was not previously visited by the mobile station.

16. The mobile station of claim 15, wherein the means for renegotiating the PPP session if the second PCF was previously visited by the mobile station and the PDSN connected to the second PCF is different than the PDSN connected to the first PCF comprises means for originating the renegotiation of the PPP session.

17. The mobile station of claim 15, further comprising means for sending an Enhanced Origination Message data-ready-send (DRS) bit of 1 or 0.

* * * * *